United States Patent [19]

McNeil

[11] Patent Number: 4,810,015
[45] Date of Patent: Mar. 7, 1989

[54] MOTOR VEHICLE BODY PROTECTION APPARATUS

[76] Inventor: Robert A. McNeil, 6701 Sandspoint, #92, Houston, Tex. 77074

[21] Appl. No.: 170,950

[22] Filed: Mar. 21, 1988

[51] Int. Cl.$^4$ ............................................. B60R 19/14
[52] U.S. Cl. ..................... 293/128; 296/136; 296/98; 296/95.1; 150/166
[58] Field of Search .................. 293/128; 296/136, 98, 296/95 C; 150/52 K, 52 R

[56] References Cited

U.S. PATENT DOCUMENTS

| 2,639,751 | 5/1953 | Flaherty | 296/136 X |
| 2,801,667 | 8/1957 | Curran | 296/136 X |
| 3,525,376 | 8/1970 | Muhlhauser | 150/52 R |
| 3,610,684 | 10/1971 | Richter | 296/152 |
| 3,665,355 | 5/1972 | Sasaki et al. | 296/136 X |
| 3,738,695 | 6/1973 | McBee | 293/1 |
| 4,014,583 | 3/1977 | Forbes | 293/62 |
| 4,125,910 | 11/1978 | Nicholai | 2/69.5 |
| 4,216,989 | 8/1980 | Tackett | 296/136 |
| 4,530,519 | 7/1985 | Marshall | 280/770 |
| 4,690,446 | 9/1987 | Warren | 296/128 |

FOREIGN PATENT DOCUMENTS

| 674216 | 11/1963 | Canada | 296/136 |
| 1043111 | 11/1958 | Fed. Rep. of Germany | 296/136 |
| 1536637 | 7/1968 | France | 296/136 |
| 99417 | 7/1980 | Japan | 296/136 |
| 928869 | 6/1963 | United Kingdom | 296/136 |
| 2177359 | 1/1987 | United Kingdom | 296/136 |

Primary Examiner—Robert B. Reeves
Assistant Examiner—Brian Sells
Attorney, Agent, or Firm—Henderson & Sturm

[57] ABSTRACT

An apparatus for protecting the side of a vehicle including a resilient foam rubber pad of a length substantially longer than the width of most conventional vehicle doors has a cloth cover around it and a plurality of magnets are attached along the top and bottom border of such cloth cover so that the device can easily and simply be attached to the side of a vehicle by merely placing it in the desired position and allowing the magnets to hold it in such position. A plurality of elastic loops are attached to the ends of the cloth cover for alternatively either attachment to a hook in the wheel-well or for holding the protection apparatus in a rolled up storage condition.

1 Claim, 2 Drawing Sheets

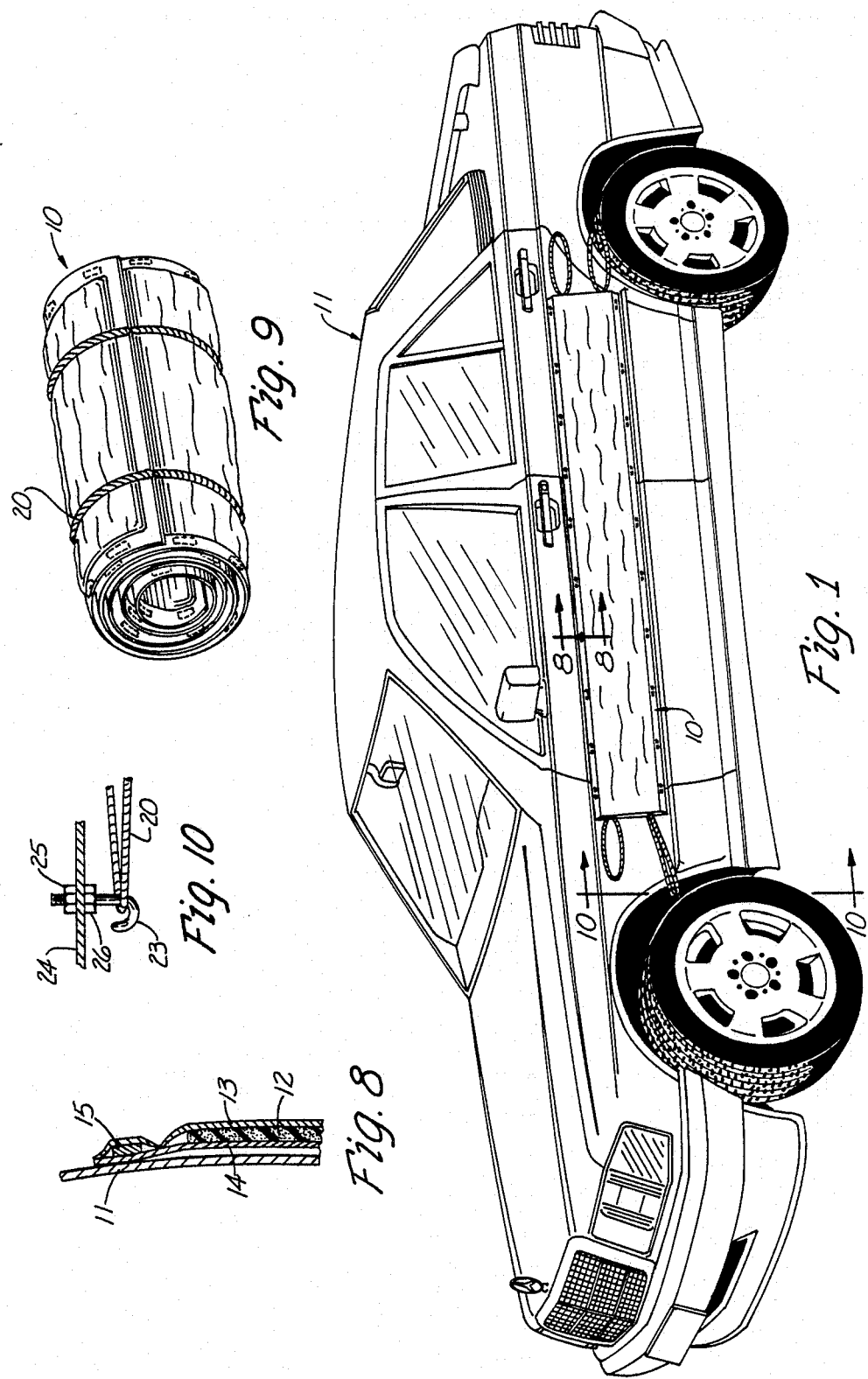

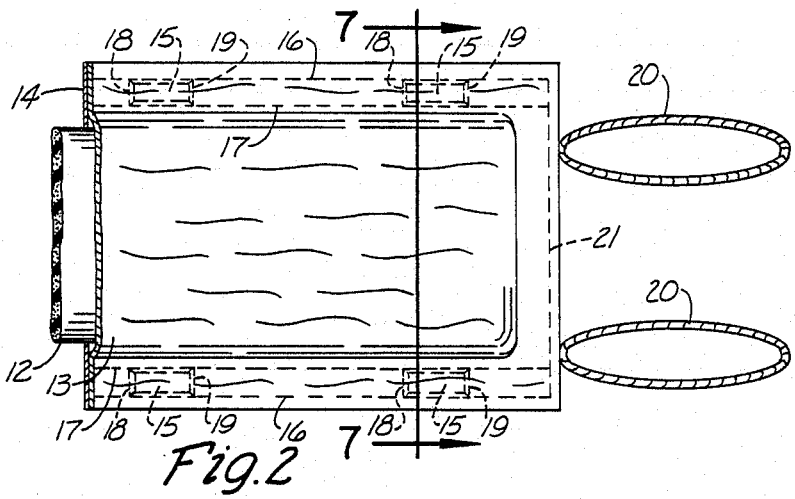
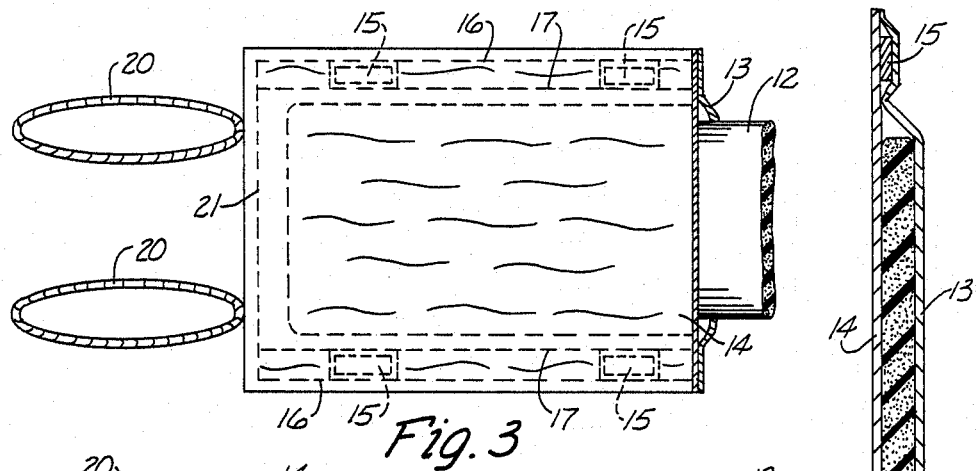
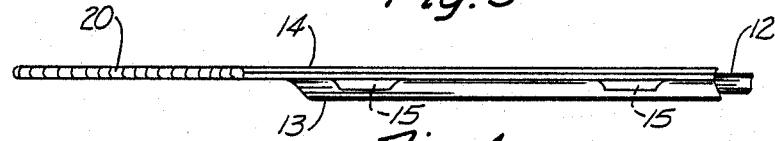
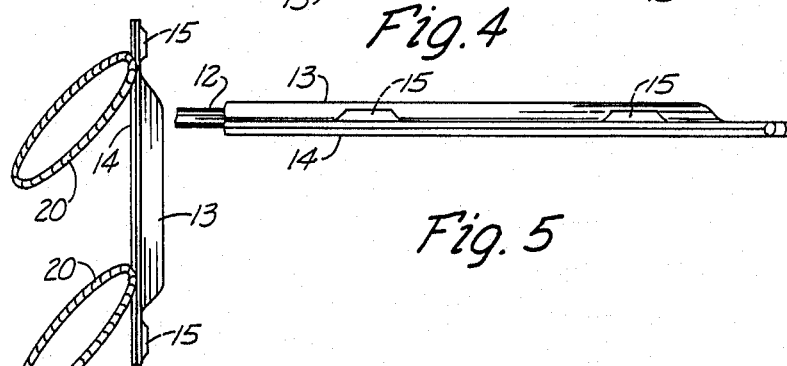
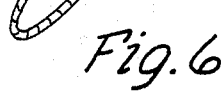
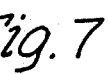

MOTOR VEHICLE BODY PROTECTION APPARATUS

TECHNICAL FIELD

The present invention relates generally to an apparatus for protecting the side of a vehicle and more particularly to such an apparatus which is attached to the vehicle by magnets and which has storage straps on the end thereof for permitting the device to be rolled up and retained in such rolled up condition for storage.

BACKGROUND ART

A common problem for people who park their vehicle in parking lots adjacent to other parked vehicles is that the opening and closing of the doors of adjacent vehicles often hit parked vehicles of other people thereby causing chipped paint and minor dents. People with new vehicles, newly painted vehicles or merely those who take very good care of their vehicles are particularly sensitive to this problem.

Various devices have been devised for attempting to solve the aforementioned problem. For example, U.S. Pat. No. 3,610,684 to Richter proposes to attach a pad to the door handle of a vehicle. One of the problems with this device is that in most newer vehicles, the handles are somewhat recessed, thereby making it difficult, if not impossible, to attach the Richter device thereto.

U.S. Pat. No. 3,738,695 to McBee proposes to use telescoping tubes suspended from the top of windows for protection purposes. A major problem with this device is installation and storage, especially since it is quite bulky.

U.S. Pat. No. 4,014,583 proposes to use some permanently attached brackets on the inside of the vehicle for suspending from straps which hold a vehicle body protection device in place. A major problem with such device is that very few people would be willing to permanently attach brackets to their vehicle. Furthermore, in alternate embodiments the attachment process appears to be extremely cumbersome since it is attached by rolling the window up and down to adjust the length of straps used to suspend the protection device.

U.S. Pat. No. 4,530,519 to Marshall purposes to use an extremely complicated device with an electric motor which rolls up a shield when not in use. Such device is believed to be too complicated and expensive to be practical.

Accordingly, there exists a need for a vehicle body protection device which is inexpensive to produce, easy to use, and easy to store when not in use.

DISCLOSURE OF THE INVENTION

The present invention relates to an apparatus for protecting the side of a vehicle. A resilient foam rubber pad of a length substantially longer than the width of most conventional vehicle doors has a cloth cover around it and a plurality of magnets are attached along the top and bottom border of such cloth cover so that the device can easily and simply be attached to the side of a vehicle by merely placing it in the desired position and allowing the magnets to hold it in such position. A plurality of elastic loops are attached to the ends of the cloth cover for alternatively either attachment to a hook in the wheelwell or for holding the protection apparatus in a rolled up storage condition.

An object of the present invention is to provide an improved apparatus for protecting the side of a vehicle.

A further object of the present invention is to provide a vehicle body protection apparatus of the aforementioned type which is economical to produce, easy and dependable to use and easy to store when not in use.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of an automobile having a vehicle body protection apparatus constructed in accordance with the present invention attached to the side thereof;

FIG. 2 is an enlarged partial view of a preferred embodiment of the present invention being broken away to show a foam rubber insert, and cloth cover, magnets and elastic storage straps;

FIG. 3 is an enlarged partial view of the other side of that which is shown in FIG. 2;

FIG. 4 is a top view of FIG. 2;

FIG. 5 is a bottom view of that which is shown in FIG. 2;

FIG. 6 is an end view of what is shown in FIG. 2;

FIG. 7 is a cross-sectional view taken along line 7—7 of FIG. 2 and showing the foam rubber, the cloth and the magnets in cross-section;

FIG. 8 is an enlarged partial cross-sectional view taken along line 8—8 of FIG. 1;

FIG. 9 is a perspective view of the vehicle body protection apparatus shown in a rolled up storage position with elastic straps holding it in such rolled condition; and FIG. 10 is a cross-sectional view taken along line 10—10 of FIG. 1.

BEST MODE FOR CARRYING OUT THE INVENTION

Referring now to the drawings wherein like reference numerals designate identical or corresponding parts throughout the several views, FIG. 1 shows an apparatus (10) constructed in accordance with the present invention attached to the side of a vehicle (11).

The apparatus (10) includes a foam rubber pad (12), for example of polyurethane foam or some other material that is of a flexible, cushiony or padded material preferrably of a length of more than the width of most conventional vehicle doors.

The foam rubber pad (12) is covered by a nylon cover including cloth portion (13) on one side thereof and cloth portion (14) on the other side thereof. This nylon or parachute-type material, of which cloth members (13 and 14) are constructed, has a plurality of magnets (15) sandwiched between the top and bottom borders of the material (13 and 14). Threaded stitches (16 and 17) on the top and bottom borders of cloth sheets (13 and 14) hold the magnets (15) in place and also hold the foam rubber pad (12) in place. Additional stitches (18 and 19) can be made on each side of each magnet (15) to prevent the magnets (15) from moving laterally between the stitches (16 and 17).

Elastic loops (20) are attached to each end of the apparatus (10) by any suitable means such as stitches, rivets or the like. Stitches (21) at each end of the apparatus (10) extend through the cloth layers (13 and 14) and prevent the foam rubber pad (12) from coming out the end thereof.

To utilize the apparatus (10) from the storage position as shown in FIG. 9, the elastic loops (20) would be removed from around the apparatus from the position shown in FIG. 9 to the position shown in FIG. 2. Then the apparatus (10) would be unrolled and placed on the vehicle (11) in the position shown in FIG. 1 on the vehicle (11).

Once so positioned with the cloth layer (14) being closest to the vehicle and the cloth layer (13) being farthest from the vehicle, the magnets (15) will immediately be attracted to the metal body of the vehicle (11) and the apparatus (10) will be held in place. If it is not immediately in the proper position, it will still be held in place whereupon it may be adjusted without fear of it dropping to the ground and becoming soiled or the like. The owner of vehicle (11) is then safe to leave and be confident that someone parking beside the vehicle (11) and opening doors will not dent or chip the side of the vehicle because such doors will come in contact with the apparatus (10) rather than contact the finish of the vehicle (11).

Optionally, hooks (23) may be installed in the metal wheelwell (24) of the vehicle (11), as shown in FIG. 10 and held in place by lock nuts (25 and 26) so that one or more of the elastic loops (20) can be stretched and hooked around the hooks (23) to further secure the apparatus (10) in place. The hooks (11) can be installed in one or both of the front and rear wheelwells and such hooks (23) can be duplicated, one for each elastic loop (20) or, alternatively, both loops (20) on each end can be stretched over a single hook (23) in a respective wheelwell.

It will be understood of course that a duplicate apparatus (10) is preferably provided for attachment to the other side of the vehicle (11).

Once the owner of the vehicle (11) returns, a reverse procedure is followed to remove the apparatus (10) from the vehicle. First, the elastic straps (20) are stretched and removed from the hooks (23), and then the apparatus (10) is rolled up into the position shown in FIG. 9 and the elastic straps (20) on one end thereof are placed around the apparatus (10) in such rolled condition to hold it in the storage position shown in FIG. 9 whereupon such apparatus (10) can be thrown into the backseat, under the seat or in the trunk of the vehicle (11) for convenient use when the vehicle is parked again in a place where the doors or side of the vehicle need to be protected.

Accordingly, it will be appreciated that the preferred embodiment disclosed herein does indeed accomplish the aforementioned objects. Obviously many modifications and variations of the present inventions are possible in light of the above teachings. It is therefore to be understood that, within the scope of the appended claims, the invention may be practiced otherwise than as specifically described.

I claim:

1. An apparatus for protecting the side of a vehicle wherein the vehicle has four wheel wells and each wheel well is provided with at least one hook; and wherein the apparatus consists of:

a resilient foam rubber pad of a length substantially longer than the width of most conventional vehicle doors;

a cloth cover completely encompassing said foam rubber pad, said cloth cover including a border extending completely around said foam rubber pad and including a top border and a bottom border;

a first continuous magnetic strip attached to said top border along the length of the top border for selectively holding the bottom border against a metal vehicle body; and, a first elastic loop means attached to both ends of said cloth cover for selectively holding said cloth cover and foam pad in a rolled up storage position when not in use protecting a vehicle; and, wherein said first elastic loop means is also adapted to engage the hooks in the wheel wells on one side of the vehicle when the apparatus is disposed in its operative position.

* * * * *